US012275268B2

(12) United States Patent
Salazar

(10) Patent No.: US 12,275,268 B2
(45) Date of Patent: Apr. 15, 2025

(54) BOOK ANIMATION DEVICE

(71) Applicant: Paul Joseph Salazar, Westminster, CA (US)

(72) Inventor: Paul Joseph Salazar, Westminster, CA (US)

( * ) Notice: Subject to any disclaimer, the term of this patent is extended or adjusted under 35 U.S.C. 154(b) by 319 days.

(21) Appl. No.: 17/971,214

(22) Filed: Oct. 21, 2022

(65) Prior Publication Data

US 2023/0129928 A1 Apr. 27, 2023

Related U.S. Application Data

(60) Provisional application No. 63/356,748, filed on Jun. 29, 2022, provisional application No. 63/305,617, filed on Feb. 1, 2022, provisional application No. 63/272,626, filed on Oct. 27, 2021.

(51) Int. Cl.
*B42D 3/18* (2006.01)
*A63H 33/28* (2006.01)
*A63H 33/38* (2006.01)

(52) U.S. Cl.
CPC ............... *B42D 3/18* (2013.01); *A63H 33/38* (2013.01)

(58) Field of Classification Search
CPC .......... A63H 33/28; A63H 33/38; A63H 3/14; B42D 3/00; B42D 3/12; B42D 3/126; B42D 3/18
USPC ............. 446/71, 82, 83, 147, 149, 327, 151; 281/15.1, 19.1, 29, 51
See application file for complete search history.

(56) References Cited

U.S. PATENT DOCUMENTS

| | | | | | |
|---|---|---|---|---|---|
| 1,179,163 | A | * | 4/1916 | Catrevas ................. | A63J 19/00 446/147 |
| 2,917,325 | A | * | 12/1959 | Sines ....................... | B42D 3/12 283/63.1 |
| 3,918,180 | A | * | 11/1975 | Chamberlin ........... | A63H 33/38 446/151 |
| 4,186,497 | A | * | 2/1980 | Legoria .................. | G09B 17/00 446/29 |
| 4,365,438 | A | * | 12/1982 | Nelson ................... | A63H 33/38 273/287 |
| 4,372,077 | A | * | 2/1983 | Balbuena ................. | A63H 3/14 446/73 |
| 4,508,515 | A | * | 4/1985 | Skolnick ................ | A63H 33/38 446/148 |
| 4,597,743 | A | * | 7/1986 | Becker ................... | A63H 33/38 446/469 |

(Continued)

*Primary Examiner* — Alexander R Niconovich
(74) *Attorney, Agent, or Firm* — Fenwick & West LLP

(57) ABSTRACT

A customizable book allows the integration of animation aids to engage readers and encourage them to interact with the story. The animation aids include a fire hose bubble blowing, puppet attachments, and apertures are configured to frame the face of a child and create the appearance of the child's face being in the book. The pages of the story may include illustrations to create the appearance that the user's face is positioned on top of a character's body. Puppet attachments may also be used and the puppet's hands can be manipulated through hand apertures to create an appearance of a moving figure on the page. The firehose bubble blowing may be used with the book by attaching a front nozzle of the bubble blowing to the book through an aperture, to create an appearance of bubbles being produced by a page of the book.

16 Claims, 12 Drawing Sheets

(56) References Cited

U.S. PATENT DOCUMENTS

| | | | | | |
|---|---|---|---|---|---|
| 4,608,024 | A * | 8/1986 | Skolnick | A63H 33/38 446/148 |
| 4,712,673 | A * | 12/1987 | Moore | B42D 3/12 273/287 |
| 4,819,963 | A * | 4/1989 | Wolski | A63H 33/38 283/64 |
| 4,850,924 | A * | 7/1989 | Becker | A63H 33/38 281/15.1 |
| 4,909,542 | A * | 3/1990 | Marks | A63H 33/38 446/72 |
| 5,031,935 | A * | 7/1991 | D'Andrea | B42D 1/004 281/38 |
| 5,383,684 | A * | 1/1995 | Smath | B42D 1/00 281/21.1 |
| 5,472,364 | A * | 12/1995 | Castleman | A63H 33/004 446/147 |
| 5,733,166 | A * | 3/1998 | Hoag | A63H 3/50 446/26 |
| 5,746,637 | A * | 5/1998 | Hunt | A63H 33/38 446/72 |
| 5,799,980 | A * | 9/1998 | McAdam | B42D 1/00 281/51 |
| 5,800,238 | A * | 9/1998 | Cowley | A63H 33/38 446/72 |
| 5,827,103 | A * | 10/1998 | Carter | A63H 33/38 281/31 |
| 5,833,509 | A * | 11/1998 | Hunt | A63H 3/003 446/73 |
| 5,915,729 | A * | 6/1999 | Vap | A63H 33/38 434/269 |
| 6,206,427 | B1 * | 3/2001 | Kremer | A63H 33/38 283/117 |
| 6,210,248 | B1 * | 4/2001 | McAdam | A63H 33/38 281/38 |
| 6,224,106 | B1 * | 5/2001 | Murphy | B42D 1/007 434/269 |
| 6,247,729 | B1 * | 6/2001 | Kaufman | B42D 3/12 281/31 |
| 6,419,493 | B1 * | 7/2002 | Cole | G09B 19/10 434/428 |
| 6,461,164 | B1 * | 10/2002 | Ramelli | G09B 19/0084 434/262 |
| 6,506,093 | B2 * | 1/2003 | Avital | A63J 19/00 446/72 |
| 6,609,942 | B1 * | 8/2003 | Cole | A63H 33/38 206/542 |
| 6,663,456 | B2 * | 12/2003 | Gemma, Jr. | A63H 3/08 446/147 |
| 6,672,929 | B2 * | 1/2004 | Leleu | A63H 3/14 446/72 |
| 6,764,372 | B1 * | 7/2004 | Rae | A63H 33/38 446/72 |
| 6,929,526 | B1 * | 8/2005 | Cole | A63H 33/38 446/72 |
| 7,467,985 | B2 * | 12/2008 | Manrique | A63H 33/38 446/108 |
| 8,376,408 | B2 * | 2/2013 | Legrand | B42D 1/007 446/151 |
| 10,549,211 | B2 * | 2/2020 | Gharibian | B42D 3/12 |
| 11,472,215 | B2 * | 10/2022 | Rosebrough | B42D 3/12 |
| 2005/0208870 | A1 * | 9/2005 | Collard | A63H 3/14 446/327 |
| 2006/0148375 | A1 * | 7/2006 | Leleu | A63H 3/003 281/29 |
| 2007/0184749 | A1 * | 8/2007 | Leleu | A63H 3/14 446/82 |
| 2007/0252376 | A1 * | 11/2007 | Legrand | A63H 33/38 281/15.1 |
| 2021/0300104 | A1 * | 9/2021 | Ost | B42D 5/006 |
| 2024/0109361 | A1 * | 4/2024 | Mandel | B42D 1/007 |

* cited by examiner

800

BOOK ANIMATION DEVICE

CROSS-REFERENCE TO RELATED APPLICATIONS

This application claims the benefit of U.S. Provisional Patent No. 63/272,626, filed on Oct. 27, 2021, U.S. Provisional Patent No. 63/305,617, filed on Feb. 1, 2022, and Provisional Patent No. 63/356,748, filed on Jun. 29, 2022, which are incorporated by reference herein in their entirety.

TECHNICAL FIELD

The disclosure generally relates to books, and more specifically to customization of books.

BACKGROUND

In general, children's books lack diversity that allow children to relate to the story. Children of color may feel marginalized or invisible if they do not see themselves in literature. When children feel they are part of the story, they may become more engaged with the book. However, physical books are typically not customizable to the different characteristics of their readers.

SUMMARY

A book is described herein. The book comprises a front cover and a back cover, each including an aperture. The apertures are configured to frame the face of a child and create the appearance of the child's face being in the book. The apertures are also configured to enable further customization of the book, by enabling the use of supplemental devices/operational animation aids, such as puppet attachments and a firehose bubble blowing device. The book may have detachable pages, the pages also having apertures that align with the apertures of the covers, such that stories can be interchanged. The book further includes handles for a child to rest their hand on throughout the story and page tabs to enable the reader to turn the pages of a story more easily.

In an example use case, a teacher may use the book while reading to a classroom of young students. The teacher selects a student to come to the front of the classroom to be part of the story. The student can stand behind the book and align their face with the aperture so that the other students in the class can see their classmate as though their classmate is in the story. The pages of the story may include illustrations to make it seem that the child's face is on the body of a lion or in a knight's suit of armor, making the child a character in the story. Puppet attachments may also be used in conjunction with the book, and the teacher can manipulate the hands of the puppet through hand apertures to create the appearance of a moving figure on the page of the book. Additionally, the fire hose bubble blowing device may also be used with the book to create the appearance of bubbles being produced by the page of the book.

The book may help to engage students and encourage them to interact with the story. Some stories that are inserted into the book can be configured such that two students can partake in the story, one putting their face through the front cover aperture while the other puts their face through the back cover aperture.

Note that the term child is used throughout the description to describe a user who may position their face within the aperture of the book. However, the book is meant for people of any age and the term is not meant to limit the use cases of the book.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
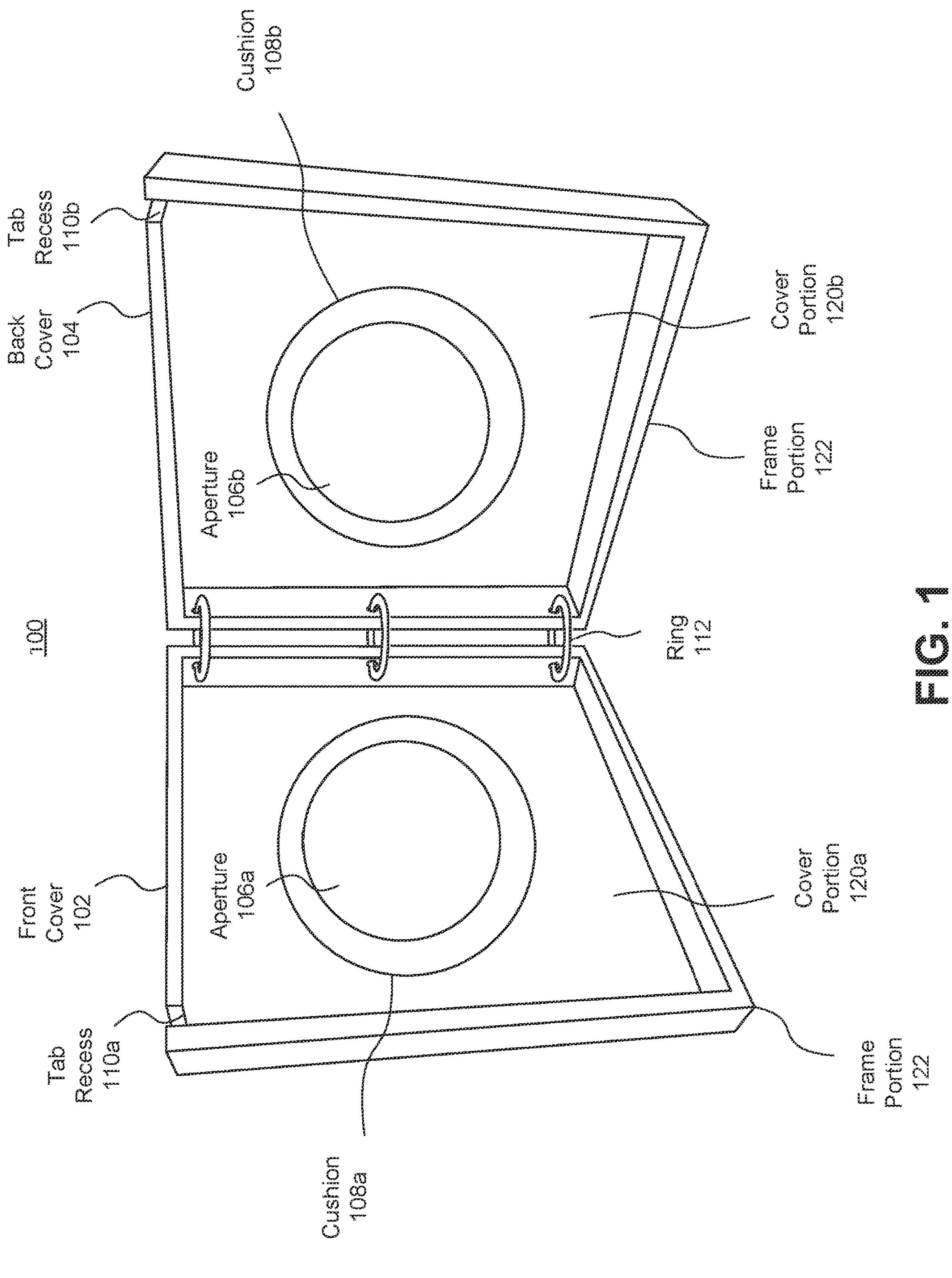
FIG. 1 shows a perspective view of the inside of a book, in accordance with one or more embodiments.

FIG. 1 shows a perspective view of the inside of a book, in accordance with one or more embodiments. The book 100 includes apertures 106 through which a face of a user (e.g., a child) is inserted so that the child can become a part of the story. The book 100 includes a front cover 102 and a back cover 104. The covers 102 and 104 are comprised of a cover portion 120 and a frame portion 122. The front cover 102 includes an aperture 106*a* in the cover portion 120*a* and the back cover 104 includes an aperture 06*b* (individually referred to as aperture 106) in the cover portion 120*b*. Each aperture 106 is sized such that a face of a user is visible through the aperture 106. For example, the apertures 106 may be circular or elliptical with diameters ranging from 3 to 15 inches. The apertures 106 may include various other shapes. In some embodiments the book 100 has more than one aperture 106 per cover portion 120. For example, each cover portion 120 may have one large aperture 106 through which a user of the book can put their face and two smaller apertures through which a user could put their hands.

The frame portions 122 is made of any rigid material. In one embodiment the frame is made of wood, while in others the frame is made of thin metal. The frame portions 112 have a depth ranging from 1 to 10 inches so that the book may be rested on the frame without needing to be otherwise supported. In some embodiments the frame portions 112 and cover portions 120 may be 3D printed. In other embodiments the cover portions are made of fabric or thin plastic to decrease the overall weight of the book 100. The frame portions 122 and the cover portions 120 have any shape with a flat bottom, such as a rectangle, square, hexagon, or partial circle. The dimensions of the frame 122 and cover 120 range from 6 inches by 6 inches to 6 feet by 10 feet. Small books 100 can be placed on a tabletop or held up to the height of a child's face while larger versions may be sized to rest on the floor and have the aperture 106 at the child's face level.

A cushion 108*a* is located around the aperture 106*a* and a cushion 108*b* is around the aperture 106*b*. The cushions 108 is made of soft or flexible material such that a user comfortably rests their face within the aperture 106. For example, the cushions may be memory foam, polyester stuffing, or elastomer. In some embodiments the cushions may be removably coupled to the aperture such that the cushions 108 can be washed between uses. In other embodiments, the cushions 108 are encapsulated by fabric covers for additional user comfort.

The book 100 is configured so that pages (not shown in FIG. 1, see FIGS. 4A and 4B) of a story are removably attached to the book so that stories can be switched out. In some embodiments the book 100 functions similarly to a binder in that the pages of a story may be put in the book 100 by opening and closing a series of rings 112, In some embodiments, such as the book 100 of FIG. 1, the front cover 102 and back cover 104 are held together by the series of rings 112 through perforations in the frame portions 112 while in other embodiments the covers 102 and 104 may be connected by a traditional book binding. The book 100 may have a button or switch that is configured to open the rings 112 all at once for ease of use. Rings 112 are not the only method of attaching pages to the book 100. In other embodiments not shown, the book 100 has hooks, snap ons, or magnets via which the pages of a story can be removably coupled to the book 100.

The book 100 further includes tab recesses 110 in the frame portion 122. The tab recesses are slots into which extended tabs of pages may fit. The tabs are included to help reader of the book 100 turn pages of the story. Characteristics of the pages are further described with reference to FIG. 4.

Figure 2:
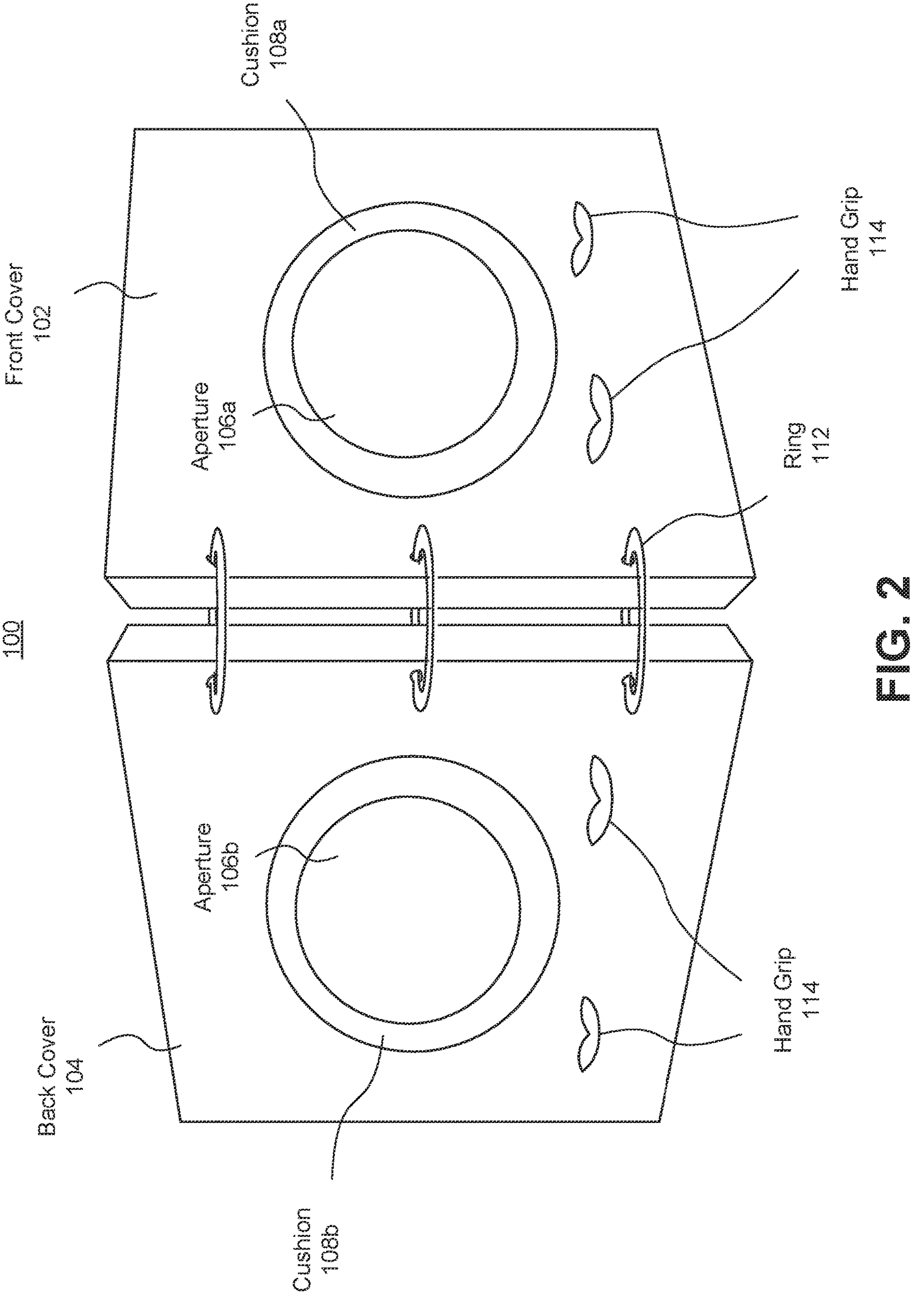
FIG. 2 shows a perspective view of the outside of the book, in accordance with one or more embodiments.

FIG. 2 shows a perspective view of the outside of the book, in accordance with one or more embodiments. In the embodiment of FIG. 2 the front cover 102 and back cover 104 are bound together by the rings 112 such that the rings 112 are visible from the outside of the book 100. The front 102 and back 104 covers additionally include hand grips 114 on which a child, or any user of the book, can rest their hands. The hand grips 114 may, for example, be rope loops that are easy to grab onto, irregularly shaped extrusions of the cover similar to rock climbing holds, short pegs, or even divots in the cover 102/104. In most embodiments, the hand grips 114 are not used for stabilization of the book 100 but rather as a place for a child to rest their hands while the story is read.

In some embodiments, the cushions 108 extend from the outside surfaces of the covers 102/104 while in other embodiments the cushions line the edges of the apertures 106.

Figure 3:
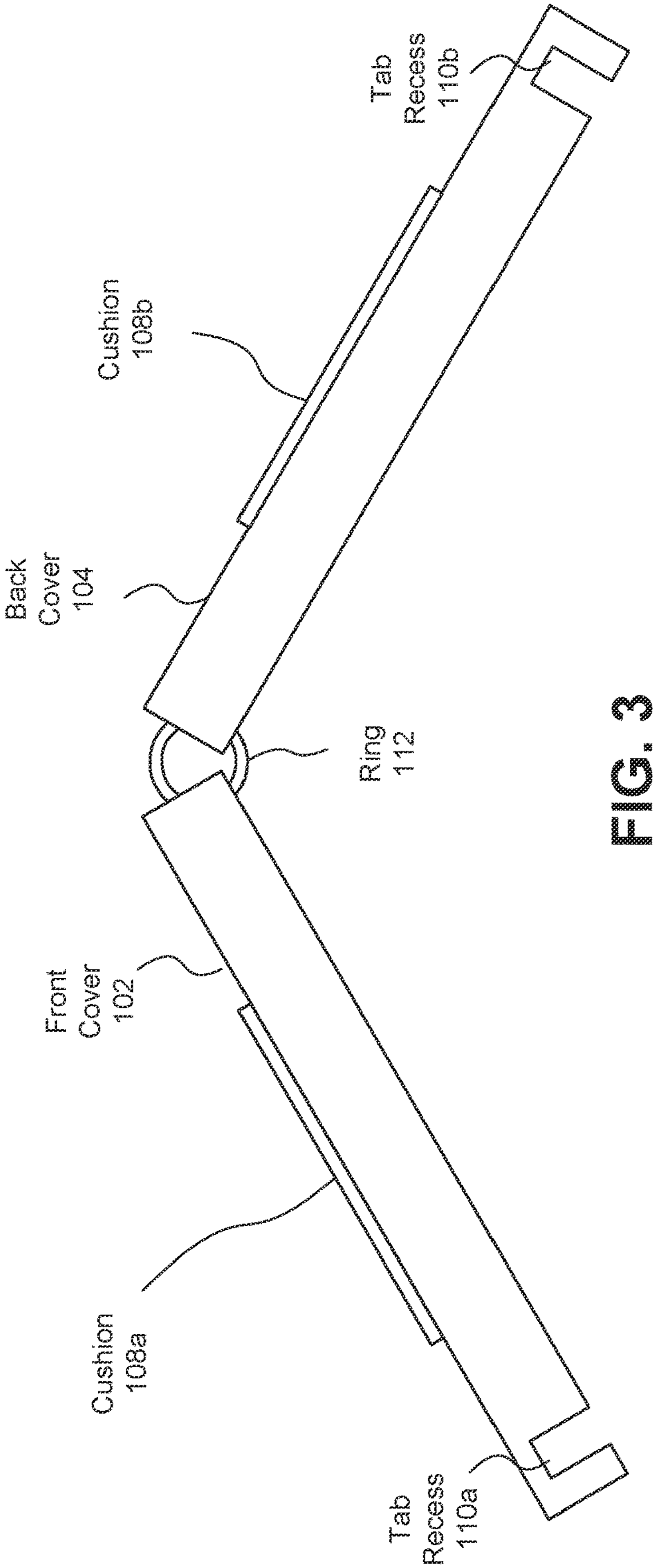
FIG. 3 shows a top view of the book, in accordance with one or more embodiments.

FIG. 3 shows a top view of the book, in accordance with one or more embodiments. As described with reference to FIG. 2, the cushions 108 of FIG. 3 are seen extending from the covers 102/104 while the rings 112 are seen connecting the covers 102/104. The tab recesses 110 are shown more clearly in the view of FIG. 3. The tab recesses may extend any depth into the frame portion 112 of the covers. For example, if the frame portion 112 has a width of 2 inches, the tab recesses 110 can have a depth of 1.75 inches to enable a large amount of story page tabs to fit within the recesses 110.

Figure 4A:
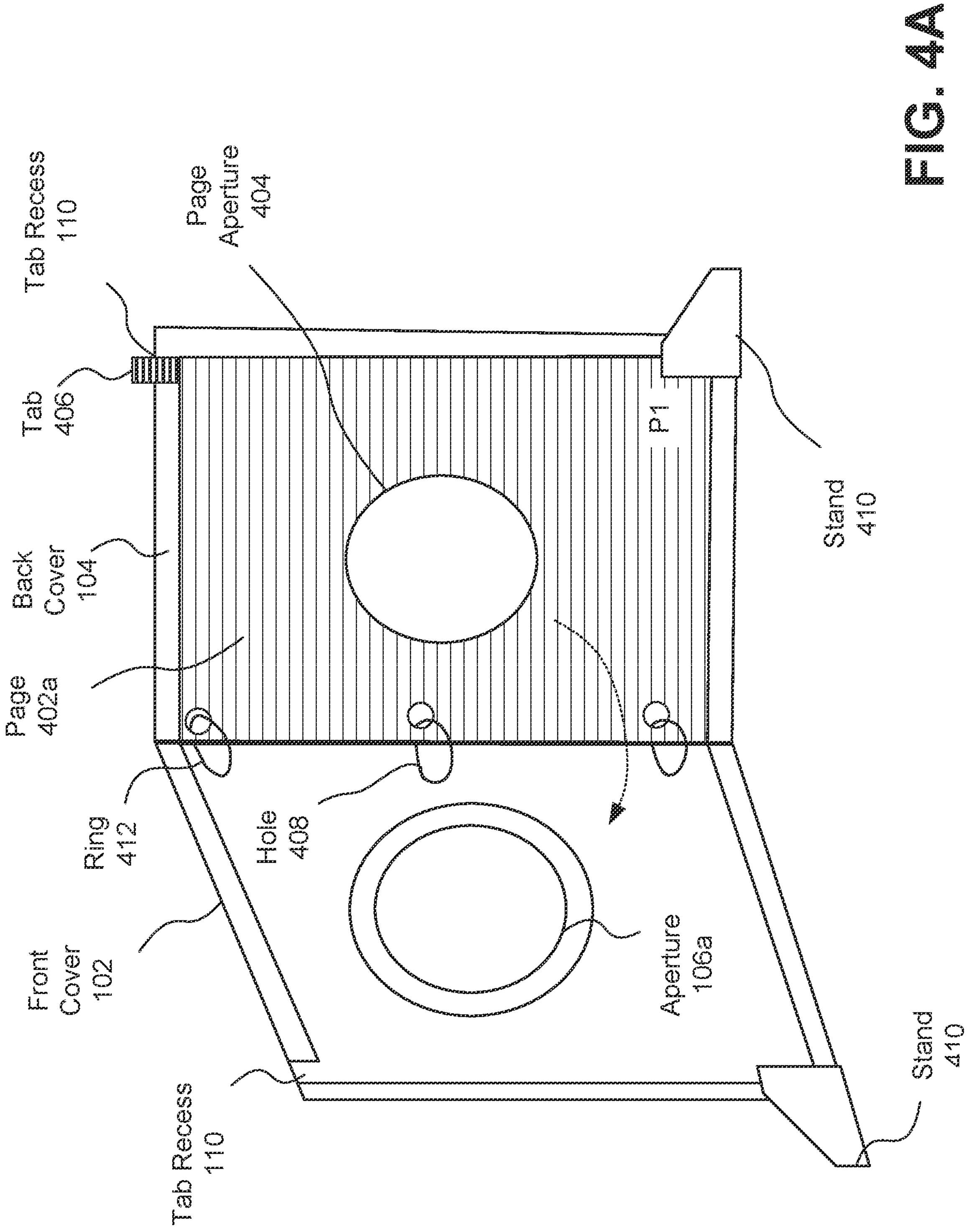
FIG. 4A shows a schematic view of the book in an open position holding multiple pages, in accordance with one or more embodiments.
Figure 4B:
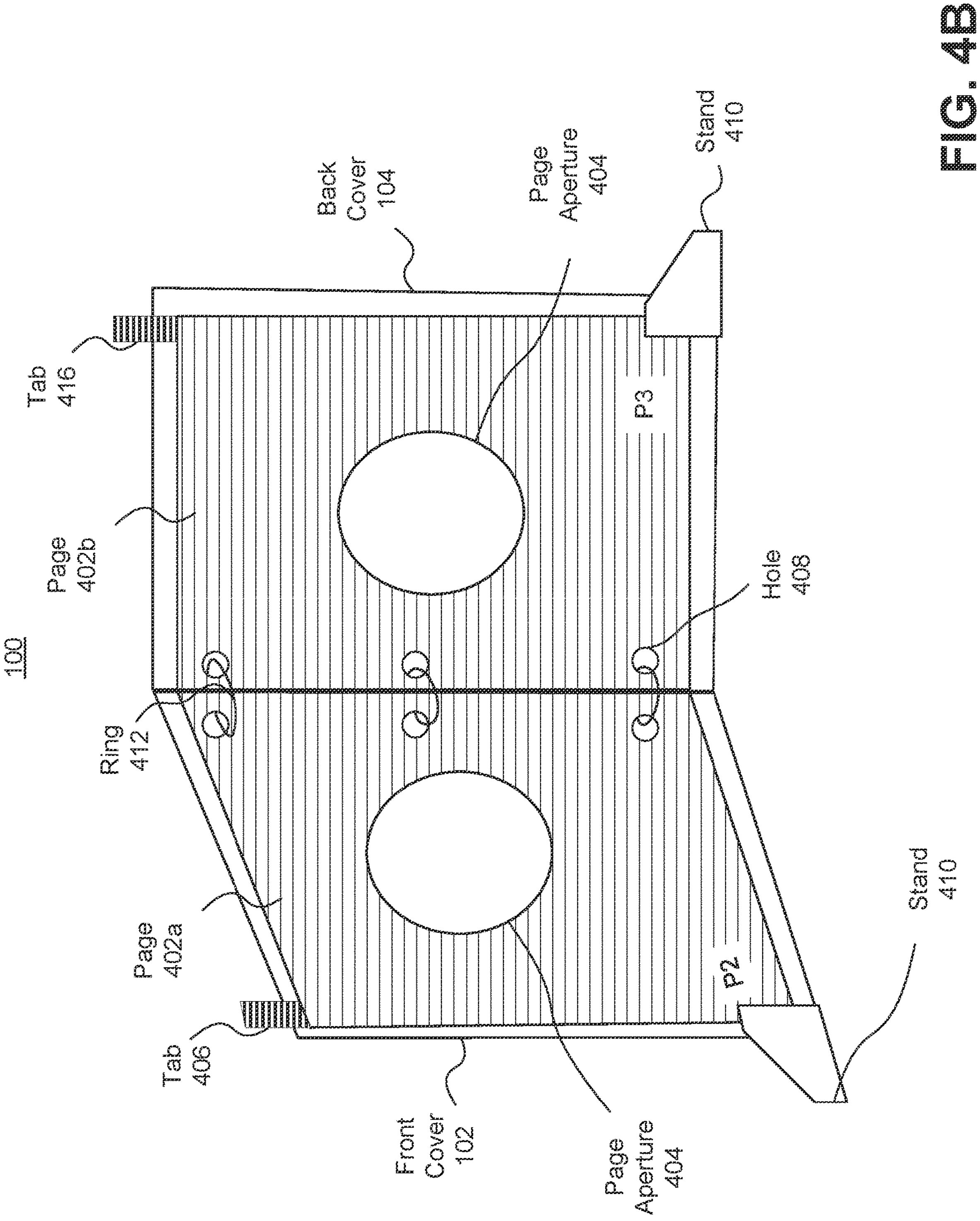
FIG. 4B shows a schematic view of the book in an open position holding multiple pages, in accordance with one or more embodiments.

FIGS. 4A & 4B show schematic views of the book in an open position holding multiple pages, in accordance with one or more embodiments. In FIG. 4A the book 100 is seen open to the first page 402*a* which, in some embodiments, is the cover or title page of a story, and is labeled P1. In FIG. 4B the page 402*a* has been turned so that the back of the page 402*a*, P2, is shown and the front of page 402*b*, labeled P3, is shown. in FIG. 4B the page aperture 404 of page 402*a* is aligned with the aperture 106*a* of the front cover 102 and the page aperture 404 of page 402*b* is aligned with the aperture 106*b* of the back cover 104.

Pages of a story may be purchased with the book 100 or separately. One book 100 can be used with any number of stories as long as the story pages 402 are configured with page apertures 404 that align with the apertures 106 of the book 100. In on embodiment, in order to put in a story a user pulls open the rings 412, threads the holes 408 of the pages onto the rings 412 and closes the rings 412. In other embodiments the pages 402 are magnetic and attract to a magnet within the spine of the book 100 having an opposite polarity, thus removably anchoring the pages 402 to the book 100. The pages may otherwise be attached to the book 100 via hooks, suction cups, clamps, or other removable attachments.

The pages 402 each have a tab 406 that extends beyond the frame portion 122 of the book 100. The frame portion 122 is configured with a tab recess 110 in which the tabs 406 fit. The tabs 406 are configured to be used by a reader of the book 100 to easily turn the page 402. Without the tabs 406, the pages 402 may be harder to turn as they are sunken into the frame of the book. The tab 406 of each page 402 of a story may have a shape, color, or length that differs from other pages of the story such that it is simple to tell which tab to grab next to turn the page.

The book 100 of FIGS. 4A and 4B additionally may include stands 410. The stands are removably or permanently attached to the frame portion 122 of the book 100. The stands 410 act as an additional support for the book 100 beyond the frame portion 122. The stands 410 also help keep the current page 402 in place. In some embodiments the stands 410 are separate parts that are clipped onto or slid onto the frame 122, while in other embodiments the stands 410 are attached to the frame 122 such as with hinges. The stands 410 are configured to be able to be moved out of the way when the book is not in use. For example, in an embodiment in which the stands 410 are connected to the frame 122 with hinges, the stands 410 are rotatable about the hinges to tuck away into the frame 122 so that the stands 410 are inside the book 100 when the book is closed. Hinged stands 410 may similarly be rotated about the hinges to sit flush to the bottom of the frame 122 and sit outside of the book 100 when the book is closed. The size, shape, and material of the stands 410 may change depending on the size of the book. For example, a 4 ft by 4 ft book may have metal stands that are 6 in by 4 in and may be weighted for additional stability while a 1 ft by 1 ft book may have 2 in by 1 in plastic stands.

Figure 5:
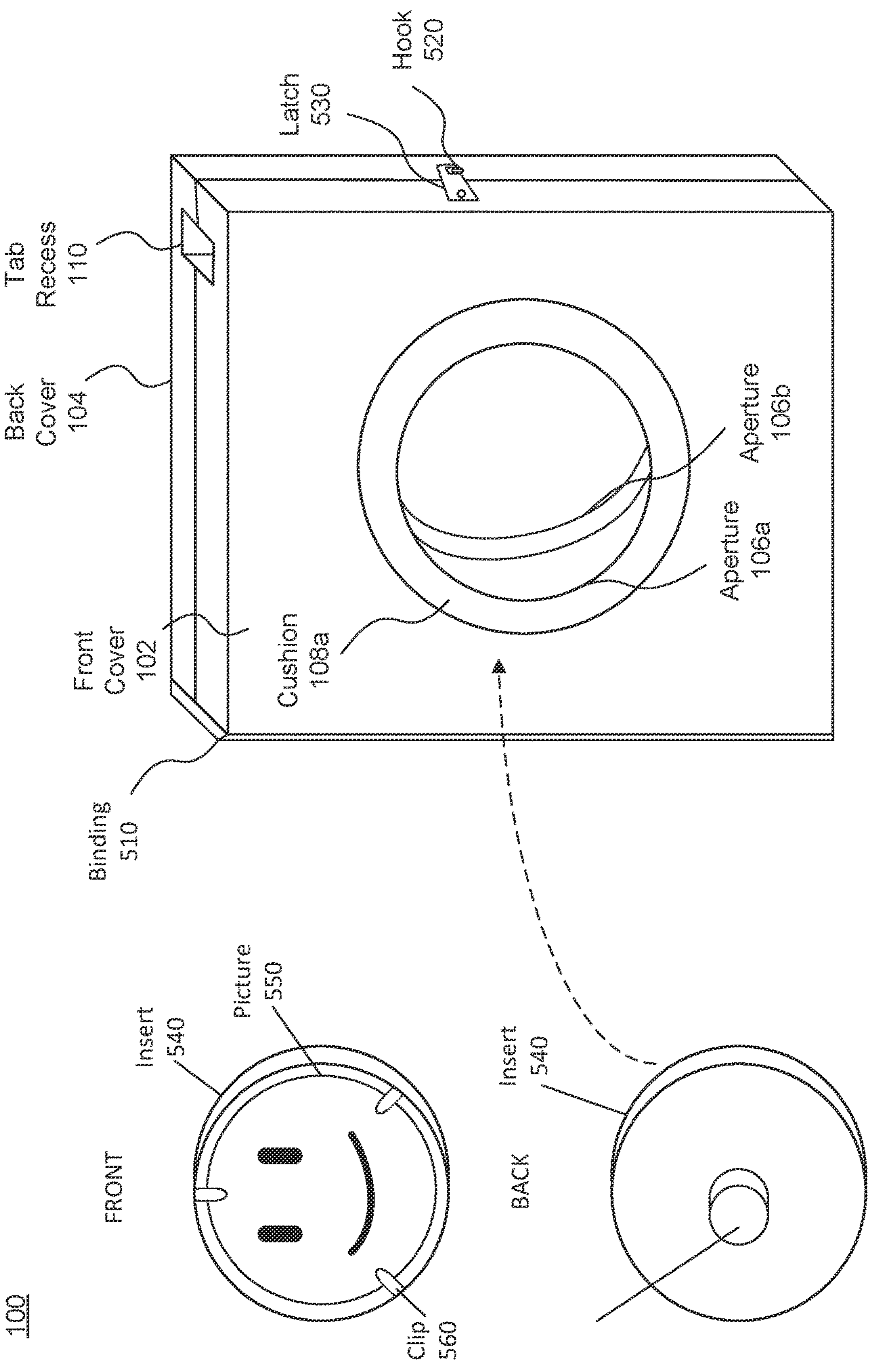
FIG. 5 shows a schematic view of the book in a closed position, in accordance with one or more embodiments.

FIG. 5 shows a schematic view of the book in a closed position, in accordance with one or more embodiments. In the embodiment shown in FIG. 5, the means of attachment for the pages is internal to the book, unlike the embodiments of FIGS. 1-3. The shown embodiment is held together by an external binding 510 that allows the front 102 and back 104 covers to be opened and closed. The binding 510 may, for example, be a hinge that connects the covers 102/104 or a strip of fabric similar to a traditional book binding. The embodiment shown in FIG. 5 additionally includes a latch 530 and hook 520 that function to hold the book 100 closed for storage purposed. The latch 530 is rotatable around a pin to catch on the hook 520 and unite the covers 102/104.

In some embodiments, an insert 540 is included with the book 100. The insert 540 is a piece of rigid material that is configured to fit snugly in the aperture 106 of the book 100. The insert 540 has clips 560 that a user can use to faster a picture 550 to the insert 540. The insert 540 is then placed in the aperture 106. When the insert 540 is in the aperture 106, the insert 540 with picture 550 allows for a picture 550 of a face to appear in a book rather than a person putting their face against the aperture 106. In this way, a user may include a picture of a loved one in the story.

The insert 540 is configured to fit within the aperture 106 and stay in without being held. For example, the insert 540 may be magnetic and be attracted to magnets within the aperture that anchors the insert to the aperture. The insert 540 may be removably attached to the aperture 106 via latches on the cover 102/104. The insert 540 additionally has a handle 570 to allow the insert 540 to be easily grabbed by a user and inserted or removed from the aperture 106.

Figure 6:
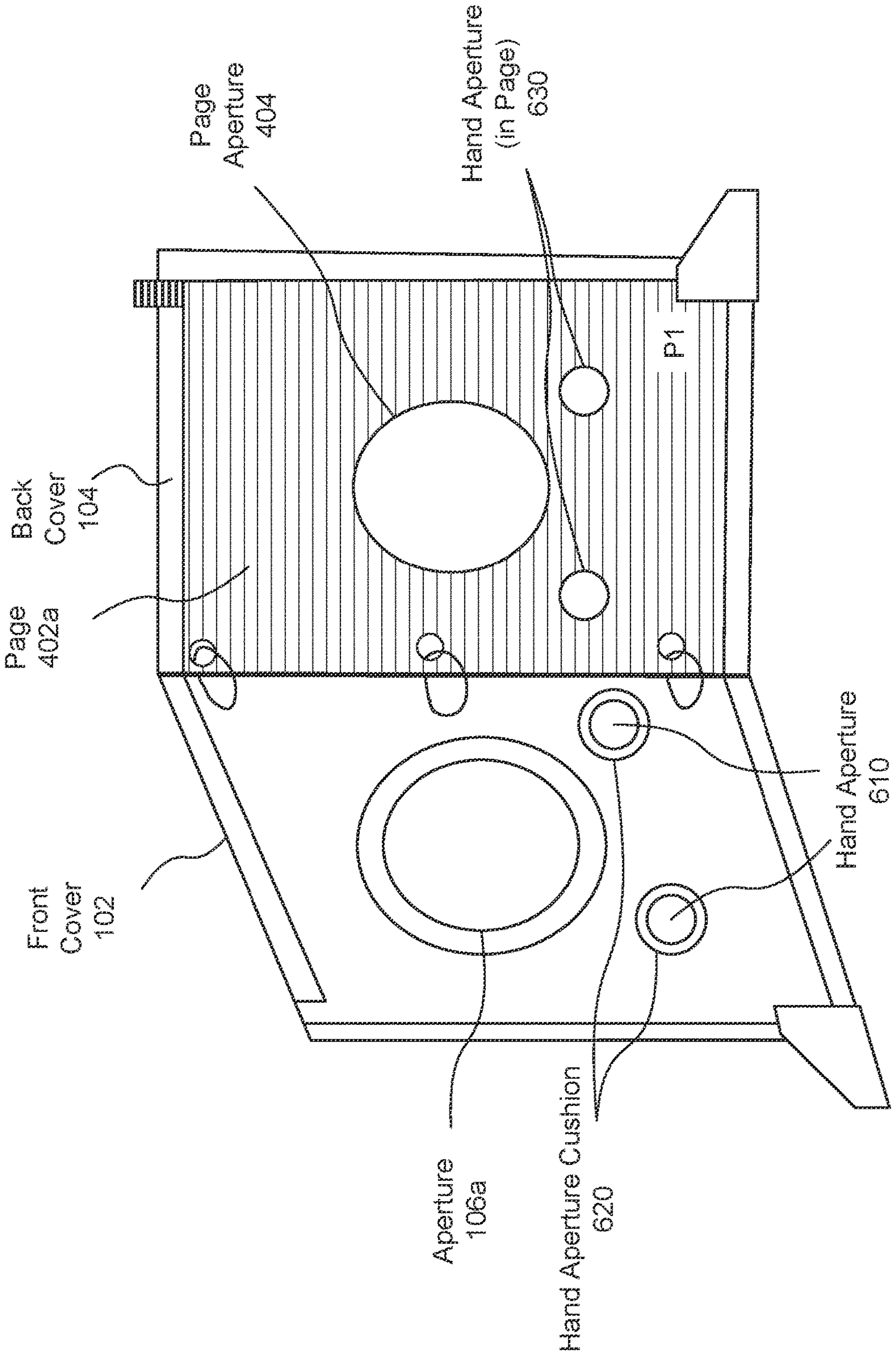
FIG. 6 shows a schematic view of the book having hand apertures as well as a face aperture, in accordance with one or more embodiments.

FIG. 6 shows a schematic view of the book having hand apertures 610 as well as a face aperture, in accordance with one or more embodiments. The hand apertures 610 may be positioned below the head aperture 106*a* in the book such that a person may put their hands through the hand apertures 620. In some embodiments, the hand apertures 610 are lined with hand aperture cushions 620 similar to the cushion 108 around the head aperture 106. This allows for a person to rest their wrists or arms against the hand aperture 610 comfortably. The pages 402 of the book have hand apertures in the page 630 that align with the hand apertures 610 of the book covers 102/104.

Figure 7:
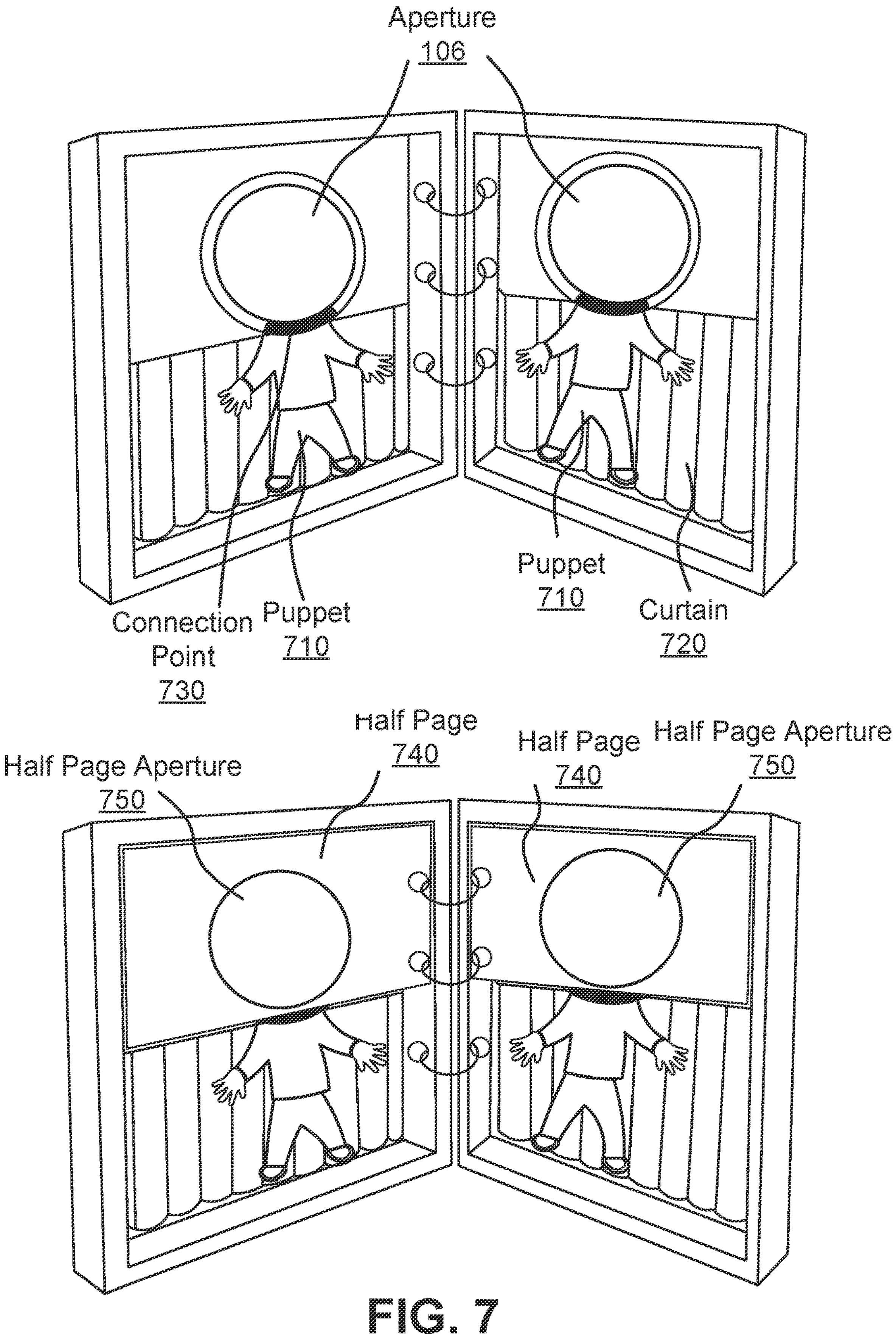
FIG. 7 shows a schematic view of the book with and without pages having a puppet attached, in accordance with one or more embodiments.

FIG. 7 shows a schematic view of the book 700 with and without pages having a puppet 710 attached to each cover of the book 700, in accordance with one or more embodiments. In the shown embodiment, the puppet 710 is a doll having a torso, arms, and legs. At the neck portion, the puppet 710 has a connection point 730 wherein the puppet 710 is connected to the cover of the book 700 such that the body of the puppet 710 aligns with the aperture 106. In some embodiments, the body of the puppet 710 hangs in front of a curtain 720 to appear as though the puppet is an actor on a stage. In some variations, the curtain 720 may be interchanged to update the background the puppet 710 is in front of.

In embodiments including the puppet 710, the pages of the story that are in the book 700 may be half pages 740. The half pages 740 include a half page aperture 750 and the text and images of the story while still allowing for the puppet's 710 body to be seen below. The half page apertures 750 align with the aperture 106 of the book 700.

In embodiments including the puppet 710, portions of the puppet's 710 body are able to be manipulated. For example, the puppet's 710 hands are connected to sticks that go through small holes in the book 700 cover such that a person standing behind the book 700 (assumably putting their face in the half page aperture 750) can move the sticks to move the hands of the puppet. In another example, the puppet's 710 hands and feet are manipulable via strings attached from above, similar to a marionette. In yet another example, the hands and feet of the puppet 710 may each have magnets such that when one or more corresponding magnets are moved on the cover to the book 700, the hands and feet move to follow the one or more magnets. Several variations of puppet 710 manipulation exist that are not covered here but are considered to be obvious to a person of skill in the art.

In some embodiments, the puppet 710 is made of paper and can be interchanged with the story pages. In those embodiments the puppet 710 may be attached via a clip or hook at the connection point 730. In other embodiments the puppet 710 is a plush toy (e.g., a fabric doll that is stuffed with a lightweight material such as cotton) and may be attached permanently or removably at the connection point 730. In additional variants the puppet 710 is plastic, cardboard, or laminated paper.

Figure 8A:
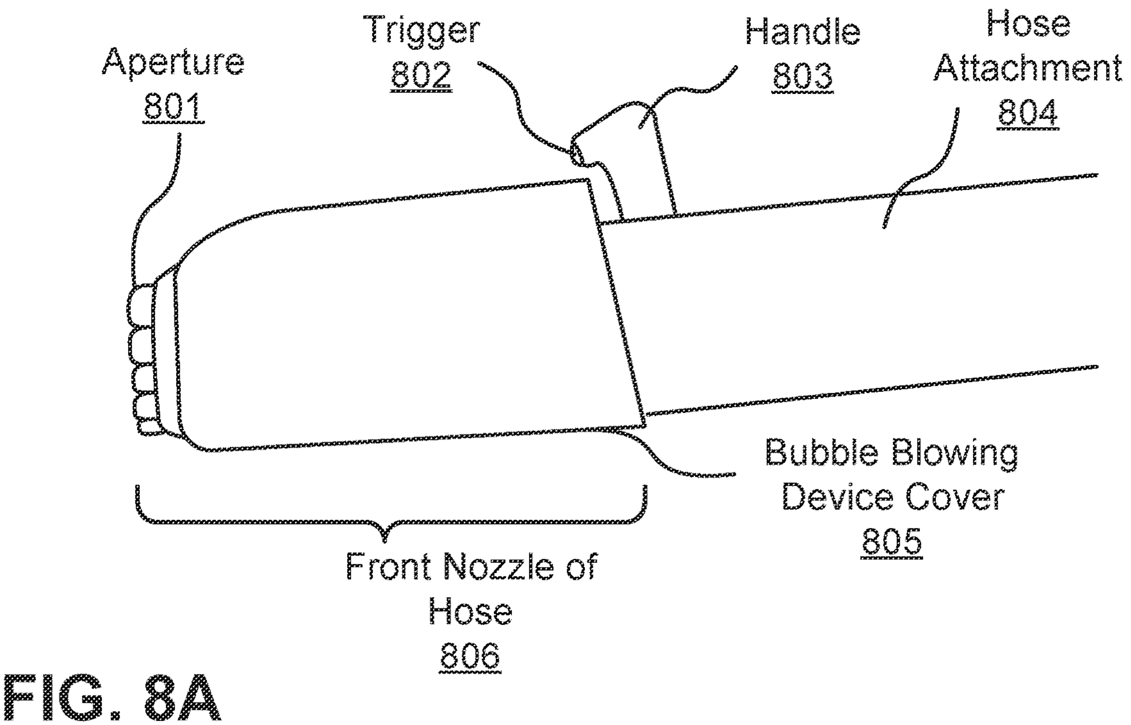
FIG. 8A shows a perspective view of a firehose bubble blowing device, in accordance with one or more embodiments.

FIG. 8A shows a side view of a firehose bubble blowing device 800, in accordance with one or more embodiments. The device 800 includes one or more apertures 801 through which bubbles are blown, a trigger 802 in a handle 803 for operating the bubble blowing device 800, a bubble blowing device cover 805 and a hose attachment 804. In the embodiment illustrated in FIG. 9A, components 801-803 are referred to as a bubble blowing mechanism 900, which will be discussed in further detail with reference to FIG. 9A. In various embodiments, the hose attachment 804 provides one or more of the following: a convenient manner of aiming and operating the bubble blowing mechanism 900, a conduit for electrical cabling for the bubble blowing mechanism 900, a conduit for an air supply for the bubble blowing mechanism 900, and a conduit for bubble solution supply for the bubble blowing mechanism 900.

In an embodiment, the firehose bubble blowing device 800 is integrated with the book 100. A front nozzle 806 of the bubble blowing device 800 is attached to the book 100 through an aperture 106*a*/106*b* to create an appearance that bubbles are being produced from the page of the book. The front nozzle 806 may be attached to the aperture 106*a*/106*b* using a variety of fasteners. Examples of fasteners may include, and is not limited to, magnets, Velcro strips, snaps, clips, tape, or any other suitable fastening mechanism. In an example use case, a reader may use the fire hose bubble blowing device 800 with the book 100 to tell a story about firefighting. The reader may push the trigger to generate bubbles to represent water expelled out of a fire hose to put out a fire.

Figure 8B:
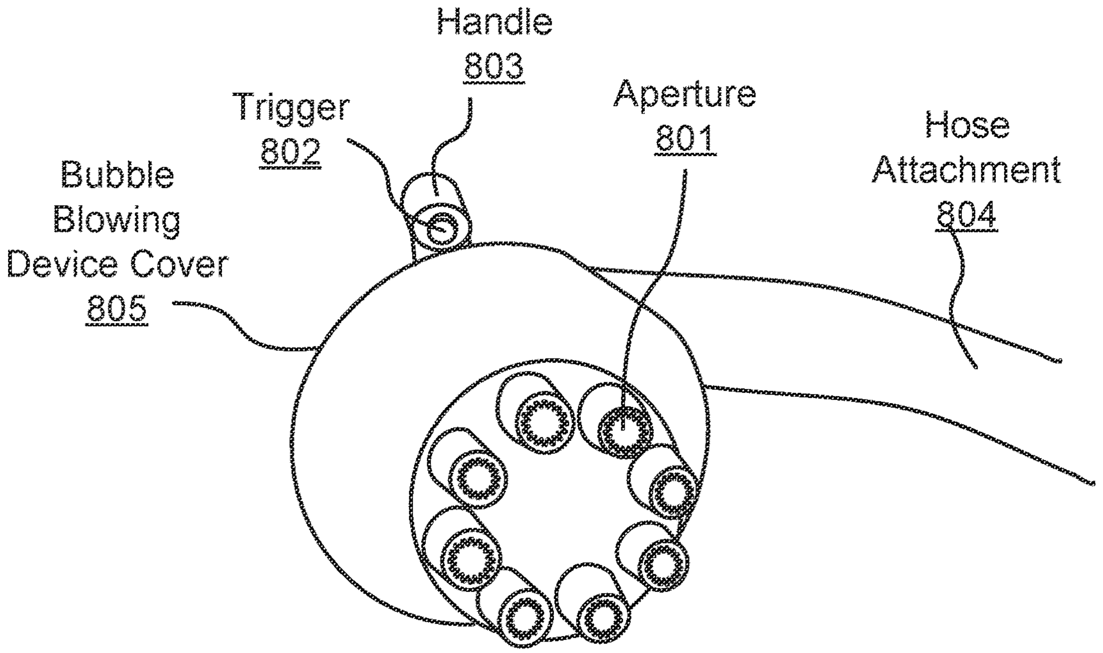
FIGS. 8B and 8C show a top view and an overhead view of a firehose bubble blowing device, in accordance with one or more embodiments.
Figure 8C:
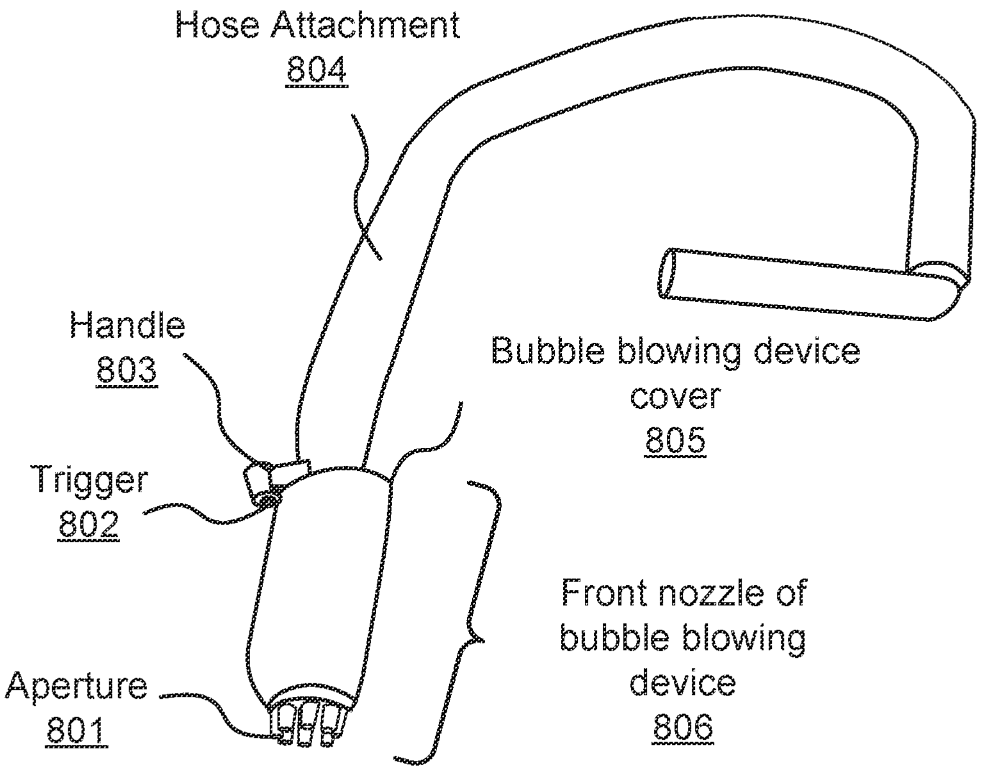

FIG. 8B and FIG. 8C shows a front view and an overhead view of a firehose bubble blowing device, in accordance with one or more embodiments. Note that the view of the bubble blowing device 800 in FIG. 8B is of the hose attachment with a bend in it at the left-hand portion (such that as illustrated FIG. 8B provides a front view of the bubble blowing device 800 at the left and a side view of hose 804 at the right)

Figure 9A:
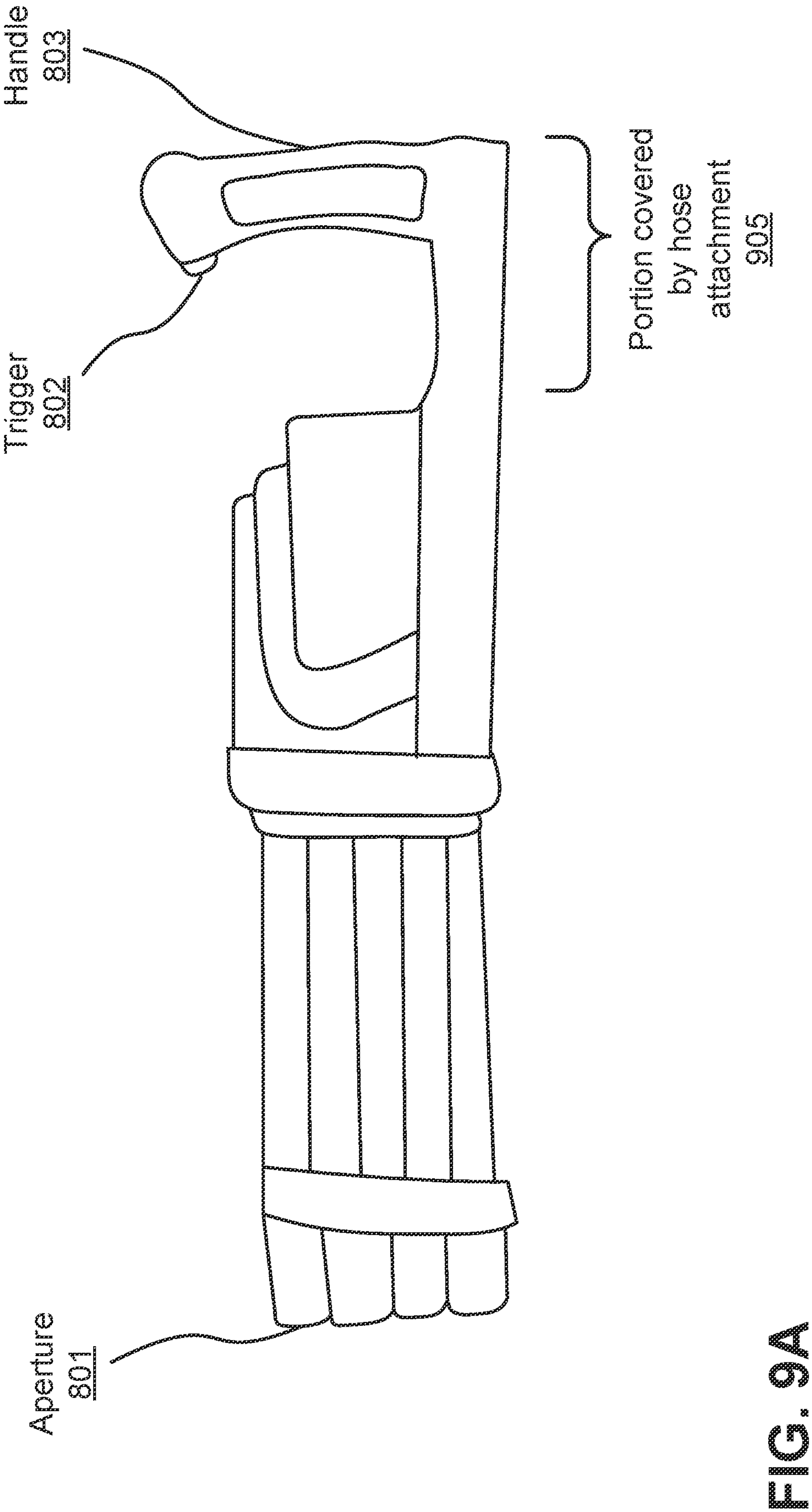
FIG. 9A shows a side view of a bubble blowing mechanism, in accordance with one or more embodiments.

FIG. 9A shows a side view of a bubble blowing mechanism, in accordance with one or more embodiments. The bubble blowing mechanism 900, bubble blowing device cover 805, and the hose attachment 804 may be combined with tape to create the bubble blowing device 800, with a firehose-like appearance. In one embodiment, the bubble blowing mechanism is implemented by a commercially available device such as the battery-powered self-contained Bubble Machine for Toddlers, 2021 that available from HUALEDI (alternatively identified as MARIDA Gatling Bubble Machine 2021 and Joyin Gatling Bubble Machine Gun). In other embodiments the components 801-803 are implemented differently so as to resemble components of a conventional firehose to a greater or lesser degree as may be desired for engagement with the target user or audience. For more extensive usage, such components are provided with air pump, compressed air supply, bubble solution supply, and/or electricity through the hose attachment 804, whether directly or via corresponding tubing/cables (not shown) within the hose attachment 804.

In some embodiments, the bubble blowing mechanism 900 includes a handle 803 and is integrated with the hose attachment 804 by use of a slit 915 in the hose attachment 804 through which handle 803 is inserted and a cover 805, alternatively made of a single piece of plastic or other suitable material or two pieces assembled (e.g., in clamshell fashion) to provide for secure attachment to hose attachment 804.

Figure 9B:
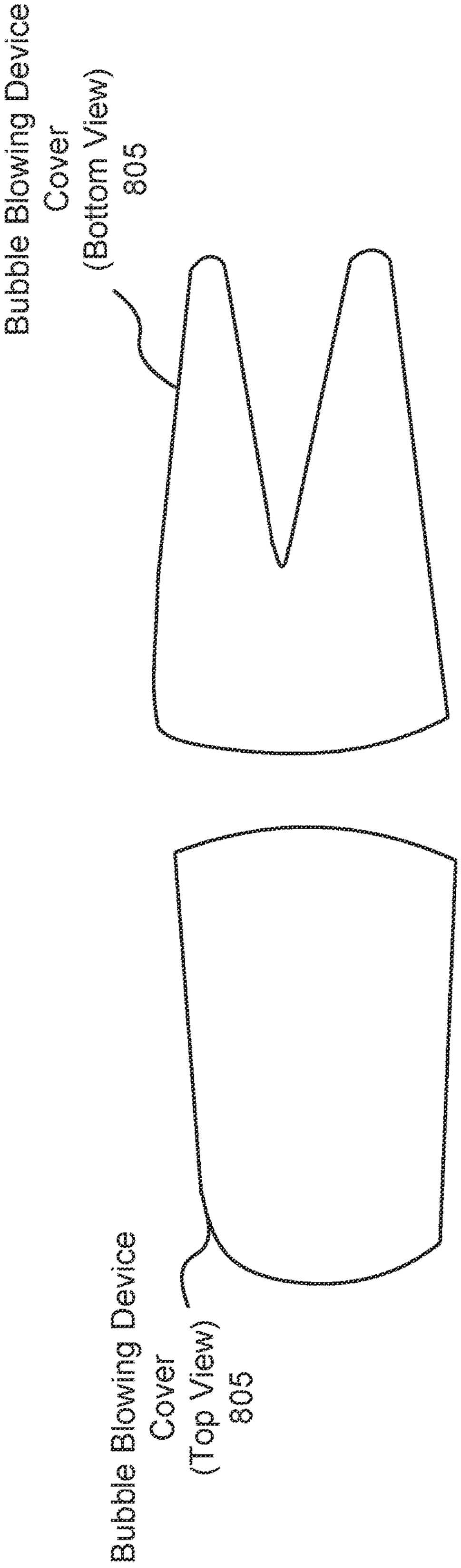
FIGS. 9B and 9C shows a bubble blowing device cover and a hose attachment, for the bubble blowing mechanism of FIG. 9A, in accordance with one or more embodiments.
Figure 9C:
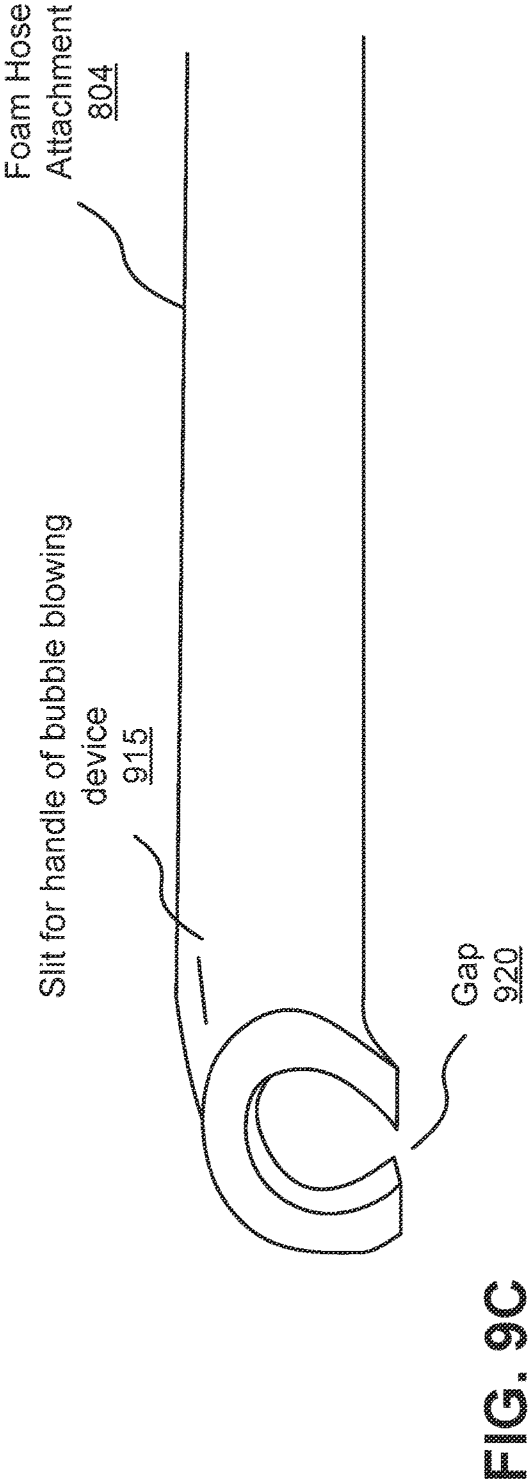

FIGS. 9B and 9C shows a bubble blowing device cover 805 and a hose attachment 804, for the bubble blowing device of FIG. 8, in accordance with one or more embodiments. Note that the view of hose attachment 804 in FIG. 9C is of the hose with a bend in it at the left-hand portion (such that as illustrated FIG. 9C provides an end view of hose attachment 804 at the left and a side view of hose 804 at the right) to show that the end of the hose has a gap 920 at the bottom to further facilitate surrounding a portion 905 of the bubble blowing device.

In one embodiment, hose attachment 804 is only functional in providing elongation of bubble blowing mechanism 900 and therefore gap 920 may extend the entire length of hose attachment 804, allowing inexpensive materials such as conventional foam pipe insulation or pool noodle to be used for hose attachment 804. In other embodiments, the hose attachment 804 is effectively water-tight or air-tight, as applicable, to convey air or water within it. Materials for hose attachment 804 may also be selected to include coverings such as tape, canvas, paper mache and to be of appropriate thickness to appear as a firehose, as well as to provide suitable durability for long-term use.

While device 800 is suitable for use as a standalone entertainment device, it is also suitable as a device to increase engagement with other activities such as educational activities. As one example, by integrating device 800 with the book 100, both users and others in attendance may have greater engagement with the subject matter being presented.

An additional component of the book 100 that is not shown in the figures is a set of wheels. The book 100 may have two or more small wheels such as caster wheels that allow for the book 100 to be moved easily. Small versions of the book 100 may not have wheels, while large versions may. The wheels may be equipped with locks such that when the book 100 is in the desired position the wheels do not keep moving.

Upon reading this disclosure, those of skill in the art will appreciate still additional alternative structural and functional designs for a book through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A book, comprising:
- a front cover including a first aperture, wherein the first aperture is configured to facilitate use of animation aids; and
- a back cover including a second aperture, wherein:
  - the first and second apertures are aligned with each other when the book is in a closed position with the front cover being aligned with the back cover;
  - the first and second apertures have a same shape; and
  - the first and second apertures have a same size,
- wherein the animation aids include:
  - a puppet attached to the book, the puppet comprising a doll having a torso, arms, and legs; and
  - a bubble blowing device configured to produce bubbles through apertures by blowing air through a membrane of bubble solution when a trigger is engaged.

2. The book of claim 1, further comprising a plurality of sheets attached with the front and back covers, each of the sheets including a sheet aperture, wherein:
- the sheet apertures are aligned with the first and second apertures when the book is in the closed position;
- the sheet apertures have a same shape as the first and second apertures; and
- the sheet apertures have a same size as the first and second apertures.

3. The book of claim 2, wherein the plurality of sheets can be detached from and reattached to the front and back covers.

4. The book of claim 1, wherein:
- the front cover includes a first cover portion and a first frame portion along edges of the first cover portion; and
- the back cover includes a second cover portion and a second frame portion along edges of the second cover portion.

5. The book of claim 4, wherein the first and second frame portions each includes a tab recess.

6. The book of claim 1, wherein the first and second apertures each have a circular shape with a diameter of between 3 inches and 12 inches.

7. The book of claim 1, further comprising one or more hand grips on an outer side of at least one of the front cover or the back cover.

8. The book of claim 7, wherein the one or more hand grips each include one of:

a protrusion on the outer side; or a groove on the outer side.

9. The book of claim 1, wherein at least one of the front cover and the back cover includes a cushion around the first aperture.

10. The book of claim 1, wherein the back cover includes a cushion around the second aperture.

11. The book of claim 1, further comprising a stand that attaches to at least one of the front cover and the back cover.

12. The book of claim 1, further comprising:

a connection point located on a neck of the doll, configured to allow the puppet to attach to a cover of the book.

13. The book of claim 1, wherein portions of a body of the puppet can be manipulated through hand apertures on a cover or page of the book.

14. The book of claim 13, wherein a circumference of a hand aperture is lined with a soft material.

15. The book of claim 1 further comprising:

a trigger, configured to enable production of bubbles when pulled;

a handle, configured for ease of gripping and aiming bubble blowing device; and a hose, conveying at least one of electricity, bubble solution and air for the bubble blowing device.

16. The book of claim 1, wherein the bubble blowing device is attached to the book using a fastening mechanism.

* * * * *